United States Patent [19]
von Glehn

[11] Patent Number: 5,716,431
[45] Date of Patent: Feb. 10, 1998

[54] DEVICE FOR SEPARATING EXTREMELY FINE PARTICLES FROM AIR

[75] Inventor: Andreas von Glehn, Vaxholm, Sweden

[73] Assignee: Freshman AB, Taby, Sweden

[21] Appl. No.: 750,455

[22] PCT Filed: Jun. 6, 1995

[86] PCT No.: PCT/SE95/00653

§ 371 Date: Dec. 6, 1996

§ 102(e) Date: Dec. 6, 1996

[87] PCT Pub. No.: WO95/33569

PCT Pub. Date: Dec. 14, 1995

[30] Foreign Application Priority Data

Jun. 7, 1994 [SE] Sweden .................... 9401947

[51] Int. Cl.[6] .................................... B03C 3/30
[52] U.S. Cl. .................... 96/17; 55/276; 55/520
[58] Field of Search .................... 96/17, 32, 39, 96/16, 40, 97, 96; 95/76; 55/520, 276; 261/94, 112.1, DIG. 72; 361/226, 233; 210/487, 493.4, 494.1; 428/119, 178, 179

[56] References Cited

U.S. PATENT DOCUMENTS

| | | | |
|---|---|---|---|
| 2,277,712 | 3/1942 | Otto | 96/97 X |
| 2,593,869 | 4/1952 | Fruth | 96/16 |
| 2,657,339 | 10/1953 | Hampe | 96/17 X |
| 2,973,830 | 3/1961 | Gruner | 96/17 |
| 3,616,604 | 11/1971 | Schouw | 96/17 |
| 3,744,216 | 7/1973 | Halloran | 96/16 |
| 3,798,879 | 3/1974 | Schmidt-Burbach et al. | 96/16 |

FOREIGN PATENT DOCUMENTS

| | | |
|---|---|---|
| 11 25 053 | 11/1984 | U.S.S.R. |
| WO 84/04467 | 11/1984 | WIPO |

*Primary Examiner*—Richard L. Chiesa

[57] ABSTRACT

A particle separating arrangement includes a filter tube (1) that is made of electrostatically chargeable fibres, for instance electrete fibres, and through which an axial air stream can pass radially in a direction from within outwardly. Within the tube (1) an insert (2) is placed, including a carrier (3) which extends transversely to the tube, the carrier having a plurality of strip elements (4) arranged to be set in motion by the passing air stream and thereby be rubbed against each other in order to produce an electrostatically charged field in their environs. This field is used to automatically and continuously keep the chargeable fibres in the filter tube wall (1) electrostatically charged.

11 Claims, 6 Drawing Sheets

DEVICE FOR SEPARATING EXTREMELY FINE PARTICLES FROM AIR

BACKGROUND OF THE INVENTION AND PRIOR ART

In normal indoor air, generally large quantities of microscopic and ultra-microscopic particles exist even in those cases where the incoming air is filtered in conventional filters before it is let in. One explanation to this phenomenon is that these filters are only capable of removing comparatively large constituents, i.e., generally speaking visible particles, while microscopic and ultra-microscopic particles pass the filters without being withheld. Another explanation is that in a room, different activities per se cause emissions of particles, man and animal being important particle-producing sources.

In the technical field of air purification, the need for a far-reaching and efficacious separation also of those extremely fine particles which have a microscopic or ultra-microscopic size, has lately increased markedly. In order to satisfy this need, the development has followed two basically different routes, of which a first one consists of making the conventional filters with ever finer fibres to make possible the trapping of ever finer particles from the passing air. Thus, there are filters today which for instance contain glass fibres whose length may be even less than 3 μm and whose thickness is even smaller. This extreme fineness of the filter fibres may render the filter itself a source of air pollution, namely in that the utmost fine fibres may be liberated from the filter wall and be let into the surrounding air. Therefore, the development of filters with ever finer fibres is limited. A further disadvantage of this development route is that filters with a considerable proportion of fine fibres cause great pressure drops in the passing air, in that the filter walls become comparatively dense and compact. In turn, a great pressure drop through a filter causes high energy costs for the fan or fans that press the air through the filter. A third drawback is that the filters will have a short life due to fast clogging.

For the above reasons, the skilled men in this field have recently inter alia paid more and more attention to filters of the type that is wholly or partly built-up of fibres which are electrostatically chargeable and which thereby may be brought to attract and trap also extremely small air-borne particles, thanks to the fact that these almost always are either positively or negatively charged or alternatingly polarized. Thus, for instance the 3M Company has developed filters containing so called electretes or electrete fibres which form dipoles by being charged electrically. In practice, such fibres are made of a suitable polymer material, such as polypropylene, of a type which has low electrical conductivity, high water-repelling capability and good thermal stability. The fibres are formed into long narrow, approximately rod-like or parallel-epipedically shaped bodies whose length may amount to 30–40 μm or more and whose thickness may amount to 1–3 μm or more. By their geometrical form, the fibres may be placed into a layer or a loop with an open, fluffy structure, resulting in that the pressure drop for an air stream passing through the fibre layer becomes comparatively low. The electrostatical charging of such fibres is effected once for all at their production, more specifically by submitting the fibres to the action of an electrical current, thereby conferring to the fibres a bipolar charge that gives rise to a strong electrical field around the fibres themselves. Thanks to their bipolar character, the fibres can attract both negatively and positively charged particles from the air. The advantages of such filters which are composed of electrically charged fibres, in comparison with fine-fibrous and electrically inactive filters, are evident in that the pressure drop through the filter is reduced to a minimum at the same time as the risk of fine-fibre emissions out of the filter itself is eliminated.

However, in practice a troublesome inconvenience of known filtering or particle separating arrangements using filters containing electrostatically charged fibres is that the charge of the fibres is of a one-time character, whereby the filters get a limited service life. Since the fibres once have been charged in connection to the production, the charge gradually decays during the use of the filter, meaning that the capability of the fibres to attract and trap passing micro-particles is gradually deteriorated. The electrostatical charge is particularly sharply neutralized when the filter gets dirty, in that the electrical field around a fibre encompassed in a surrounding cover of dirt becomes very mediocre in comparison with the field around a clean fibre. Another short-coming of such conventional particle separating arrangements which make use of simple filter walls of a stationary or fix character is that they lack any effectively working pre-separating function. Thus, the particle-containing air that passes through the filter wall in question is purified in the filter wall without first having passed any pre-separating means, which first separates coarser particles without loading the filter itself. In other words, both microscopic and ultra-microscopic particles will precipitate without distinction upon and load the fibre structure in the filter wall.

OBJECTS AND FEATURES OF THE INVENTION

The present invention aims at removing the above mentioned inconveniences and shortcomings of previously known particle separating arrangements and providing an arrangement which is capable of efficiently separating extremely fine constituents from air or other gasses during a long time, without any necessity of electrical energy from outside. Thus, a primary object of the invention is to create a particle separating arrangement whose filter unit shall have a long service life and be capable of efficiently separating microscopic and ultra-microscopic particles from air without causing any fibre emissions into the air itself. A further object of the invention is to provide an arrangement which comprises a pre-separating function before the filter unit or filter wall per se for a pre-separation of mainly positively charged and/or polarized particles, to thereby load the filter wall with substantially only ultra-microscopic particles of opposite polarity. Still another object of the invention is to create an arrangement that guarantees a low pressure drop of the air that passes through and is treated in the arrangement. A further object of the invention is to provide an arrangement which is constructively simple and which may be manufactured by making use of economical production methods.

Basically, the present invention is founded on the insight that an electrostatical field is created a set of elements, which are set in motion by an air stream passing through a filter tube and are rubbed against each other, which electrical field is of a considerable magnitude and extends far outside the set of elements per se. Thus, performed tests have shown that the electrostatically charged field around a set of plastic strips may have a voltage within the range of 5 to 10 kV and maintain this voltage at a distance from the strips amounting to 30 to 50 mm or more. In this way, a set of strip or thread elements may be used for keeping chargeable fibres automatically and continuously electrostatically charged in a surrounding filter tube wall which is mechanically unaffected by the strip or thread elements, as soon as air is brought to pass through the filter tube. On this occasion, the strips in the strip set will work as a pre-separator when the material in the strips is chosen in a suitable manner, namely with a smooth surface and a material structure which make air intrusion into the strips impossible, in that particles which are attracted by and trapped upon the surface of the strips agglomerate on the same and form growing accumulations which at a certain size will be removed from the strips, thereby being able to fall down for instance upon a closed bottom at a lower end of the filter tube, or be transported towards the filter, where they are easily separated purely mechanically due to their size.

FURTHER ELUCIDATION OF PRIOR ART

In WO 84/04467 a previously known filter tube is disclosed, within which is arranged a set of long narrow, flexible strips which can be made of a polymer material in order to generate static electricity when they are set in motion and are rubbed against each other by the influence of the passing air. However, in this case the strips are arranged in a comparatively thin ring in immediate connection to the inside of the cylindrical filter wall of the tube and any cross-sectionally intercepting carrier of the sort that characterizes the present invention does not at all occur. Moreover, it should be pointed out that the ring-likely arranged strips are in direct contact with the inside of the filter wall. This implies that the strips must be made of an air-pervious, porous or fibrous material, wherefore a self-cleansing effect of the kind that may be attained for air-impervious strips with a smooth surface, is not at all realizable. It may also be noted that the filter wall of this known construction does not contain any pronounced chargeable fibres, such as electrete fibres.

Furthermore, in SU 1 125 053 a particle separating device is disclosed which comprises a set of movable strips fixed on a carrier, which strips are rubbed against each other when influenced by passing air, thereby generating static electricity. However, according to this known construction, there is no filter tube wall at all enclosing the strip set and even less any wall containing electrostatically chargeable fibres.

BRIEF DESCRIPTION OF THE APPENDED DRAWINGS

In the drawings:

FIG. 1 is a vertical longitudinal section of an arrangement according to the invention, FIG. 2 is a cross-section of a filter tube comprised by the arrangement according to FIG. 1, FIG. 3 is a longitudinal section of an embodiment that resembles the one shown in FIG. 1, different voltage fields, that arise when the arrangement is in operation, being schematically illustrated, FIG. 4 is a longitudinal section of a further developed embodiment of a particle separating arrangement which besides a filter tube and a first strip set arranged therein, comprises a second strip set downstreams of the filter tube, FIG. 5 is a longitudinal section of a further alternative embodiment of the arrangement, and FIG. 6-10 are illustrations intended to elucidate the production of a strip carrier comprised by the arrangement, the different figures showing consecutive steps during the production.

DETAILED DESCRIPTION OF PREFERRED EMBODIMENTS OF THE INVENTION

Figure 1:
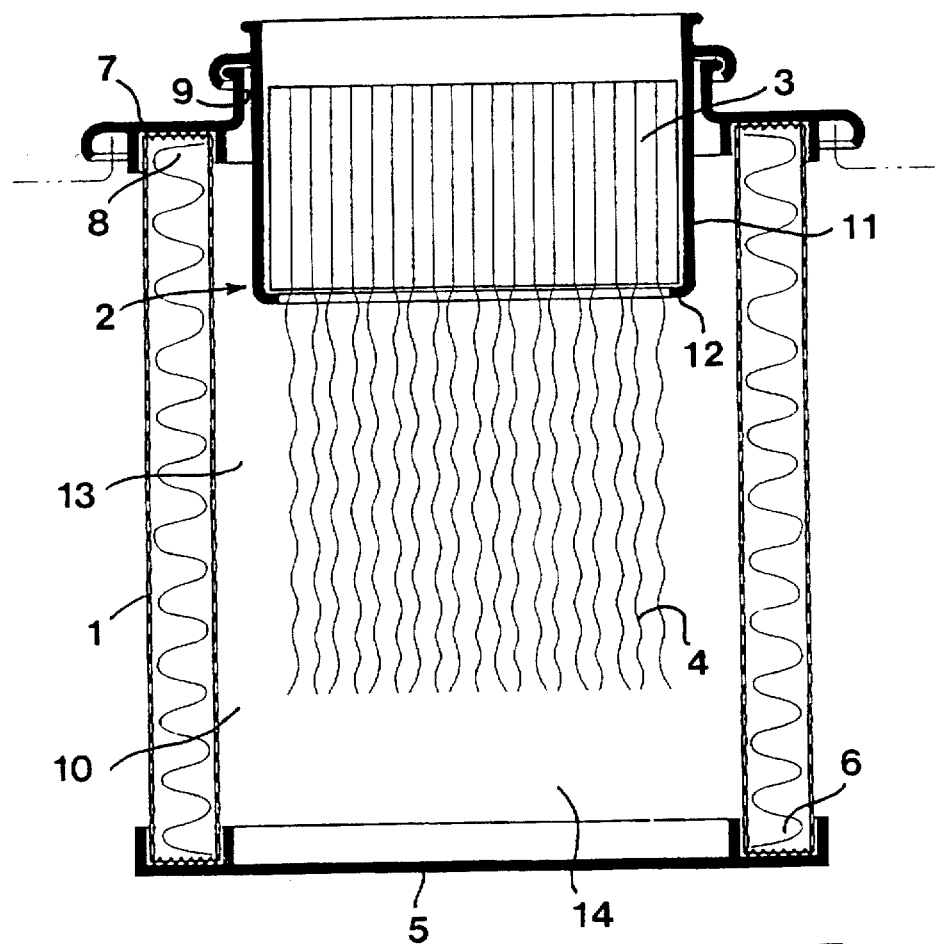

In FIG. 1, reference numeral 1 generally designates a filter tube in which is mounted an insert designated in its entirety by reference numeral 2, which is composed partly of a carrier 3 and partly of a set of strip- or thread-shaped elements 4 which are fastened on the carrier 3. At a first end, which in this case is shown down in the lower part, the filter tube 1 is connected to a bottom or gable wall 5, e.g. in the form of a plate made of sheet-metal or plastic having a peripherical groove 6 in which the end of the tube may be fastened, for instance by gluing. At its opposite end, the filter tube 1 is connected to a ring 7, for instance by being glued into a groove 8. The ring 7 delimits an opening 9 which forms an inlet to the inner cavity 10 of the tube. A sleeve 11 is snapped-in upon a cylindrical flange of the ring 7, which sleeve serves as a holder for the carrier 3 of insert 2. It may be clearly seen in FIG. 1 how the carrier 3 can be kept in the holder sleeve 11, resting upon a lower flange 12 which is directed radially inwardly at the same time as the strips or threads 4 hang down substantially vertically from the carrier.

Figure 2:
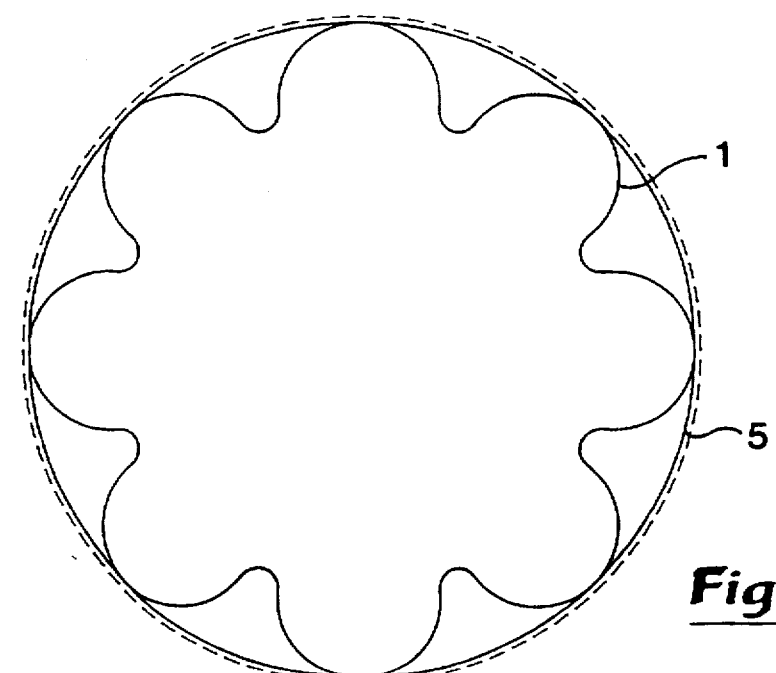

The geometrical form of the filter tube 1 may be varied within wide ranges. However, in practice a tube may advantageously be used whose wall is pleated or corrugated as indicated by the cross-section according to FIG. 2. In this context, it should also be pointed out that the tube can be made either of a simple fibre wall or be composed of two or more wall layers on top of each other. However, independently of its geometrical constitution the wall of the filter tube shall be wholly or partly made of electrostatically chargeable fibres, preferably in the form of electrete fibres of the sort that is produced of polymer materials, e.g. polypropylene, and which has the capability of taking up bipolar electrical charge. In practice, such electrete fibres have a smallest length of 30 μm and a smallest thickness or cross-sectional dimension of 1 μm. By its initially described geometrical form, such fibres may be arranged into an open, fluffy structure that offers only a slight resistance to the passage of air. However, in spite of this fluffiness the fibres have a great capability of attracting negatively as well as positively charged particles in the air due to the fact that the fibres are bipolarly charged.

In turn, the strips or threads 4 hanging down from carrier 3 are most advantageously made of a polymeric material or tetrafluoroethylene which have on one hand such a high density that air does not manage to penetrate the strips and on the other hand a flush or smooth surface. During rubbing or friction against air, these strips give a negative polarization in order to thereby attract positive particles which are in excess in air. By choosing the strips or threads of such a material, it is made possible to remove accumulations of particles having been attracted by the strips and having agglomerated on their smooth surface from the surface after the accumulations have grown to a certain size. In other words, the strips become self-cleansing by this choice of material, inasmuch as the individual particle accumulations or agglomerations are continually liberated from the smooth surface after having grown to a certain size, either to fall down upon the bottom 5 or to be trapped in the filter wall 1.

As may be clearly seen in FIG. 1, the inner diameter of the filter tube wall 1 is considerably larger than the outer diameter of the holding sleeve 11 and the substantially cylindrically shaped set of strips 4 hanging down under said sleeve. In this way, an endless or circumferential air gap 13 is formed between the outside of the strip set and the inside of the filter wall, which gap is provided for preventing or counter-acting a direct contact between the strips and the filter wall. In practice, the inner diameter of the filter tube wall may be 5 to 50, suitably 20 to 40% larger than the outer diameter of the strip set. In this context, it should also be pointed out that the sleeve 11 may have a considerably larger axial extension than in the example shown in FIG. 1, it being possible to wholly or partly include the strip set in an extended part of the sleeve. It may further be noted that the free end of the strip set is distanced from the bottom plate 5, whereby a pronounced air gap 14 is formed between the strip set and the bottom plate. By the fact that the strips are distanced from the filter tube wall in the described manner, there is no risk that the dense air-impervious strips be laid upon the filter wall and obstruct the air flow through the wall. That the strips can be kept distanced from the filter tube wall is based on the fact that the strips, when being rubbed against each other, produce a field of static electricity whose extension transversely as well as longitudinally is considerably larger than the volume of the substantially cylinder-shaped strip set. This implies that the field can influence the chargeable fibres with a high voltage in the filter wall, even in the case where the strip set is kept enclosed in a surrounding housing.

The function of the arrangement according to the invention is obvious. When air is sucked into the cavity 10 of the filter tube via the single inlet 9, an air stream is brought about which initially is substantially axially oriented, whereafter it is gradually diverted into a radial flow in which the air passes from within and outwardly through the fluffy filter wall 1. The strips are set in motion by the axial flow and are rubbed against each other, thus generating said electrical field. The electrical field charges the electrete fibres present in the filter wall 1, whereby the particle-attracting capability of these fibres is constantly maintained as soon as the arrangement is in operation, i.e., as soon as the strips are set in motion by the passing air. This maintenance charging of the electrete fibres is made in an efficient manner also in the case where the fibre structure in the filter wall has become dirty even to a considerable extent.

Figure 3:
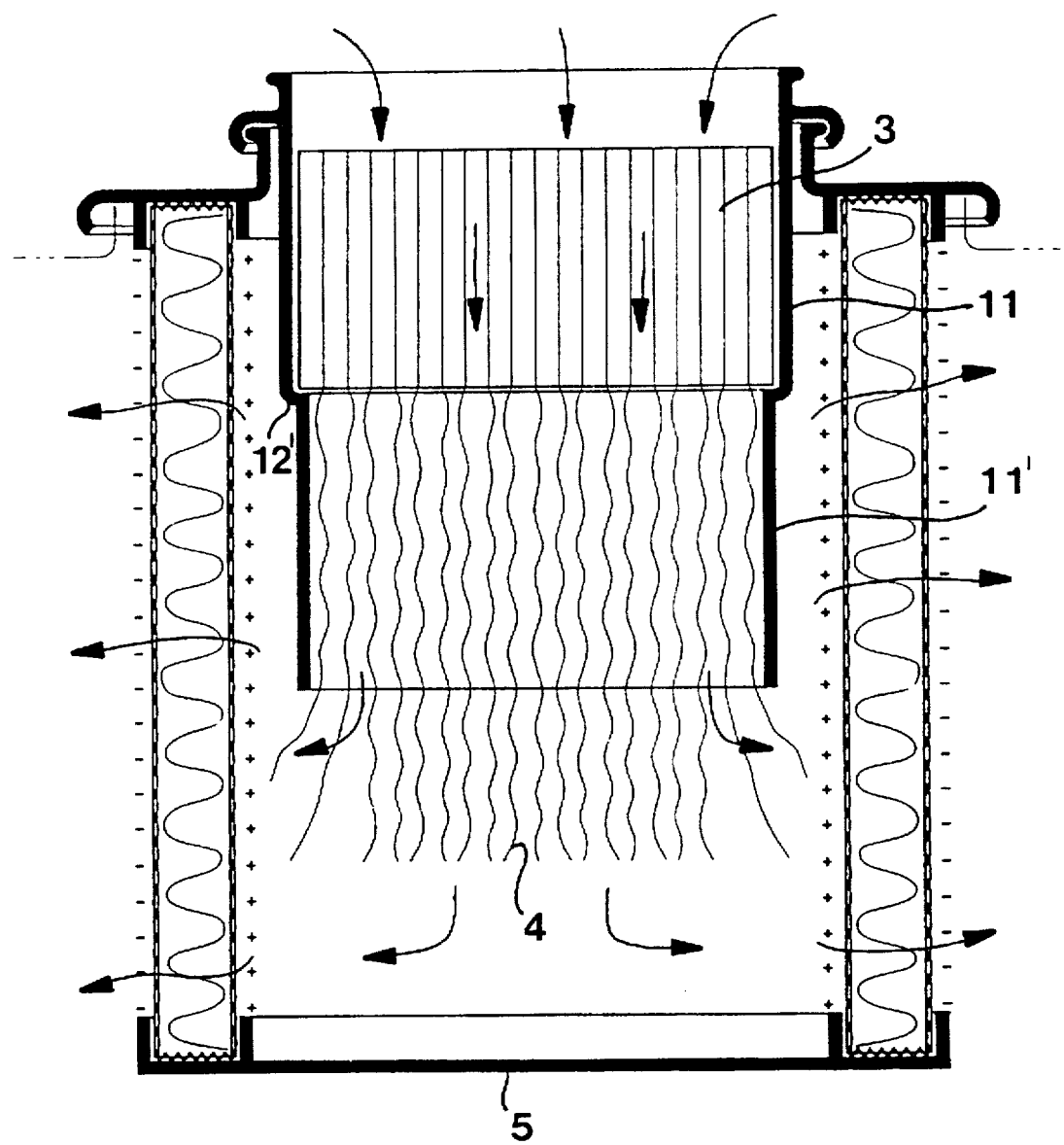

Reference is now made to FIG. 3 which illustrates an embodiment according to which the holder sleeve 11 has been extended by a part 11' that to a major extent encompasses the strip set 4. In this case, the carrier 3 rests upon a ring-shaped shoulder 12'.

The air-borne microscopic or ultra-microscopic particles occurring in air are generally positively charged. Therefore, according to the invention it is preferred to make the strips 4 of a material, e.g. precisely polypropylene, that gives a negative polarity in the strips when these are rubbed against each other, as schematically illustrated in FIG. 3. This has the result that the bipolar fibres in the filter tube wall 1 are given a mainly positive charge in the area of the inside of the filter wall, while the charge in the area of the outside of the filter wall becomes negative. By the fact that the strips 4 are negatively charged, these in first hand attract positively charged particles, which agglomerate on the strips and to a large extent fall down to the bottom of the filter tube in the previously described manner or, alternatively, are filtered purely mechanically in the filter wall, and the negatively charged particles of the air mainly make their way to the filter wall 1, where they are attracted and trapped mainly in the area of the side of the fibre structure facing inwardly.

Figure 4:
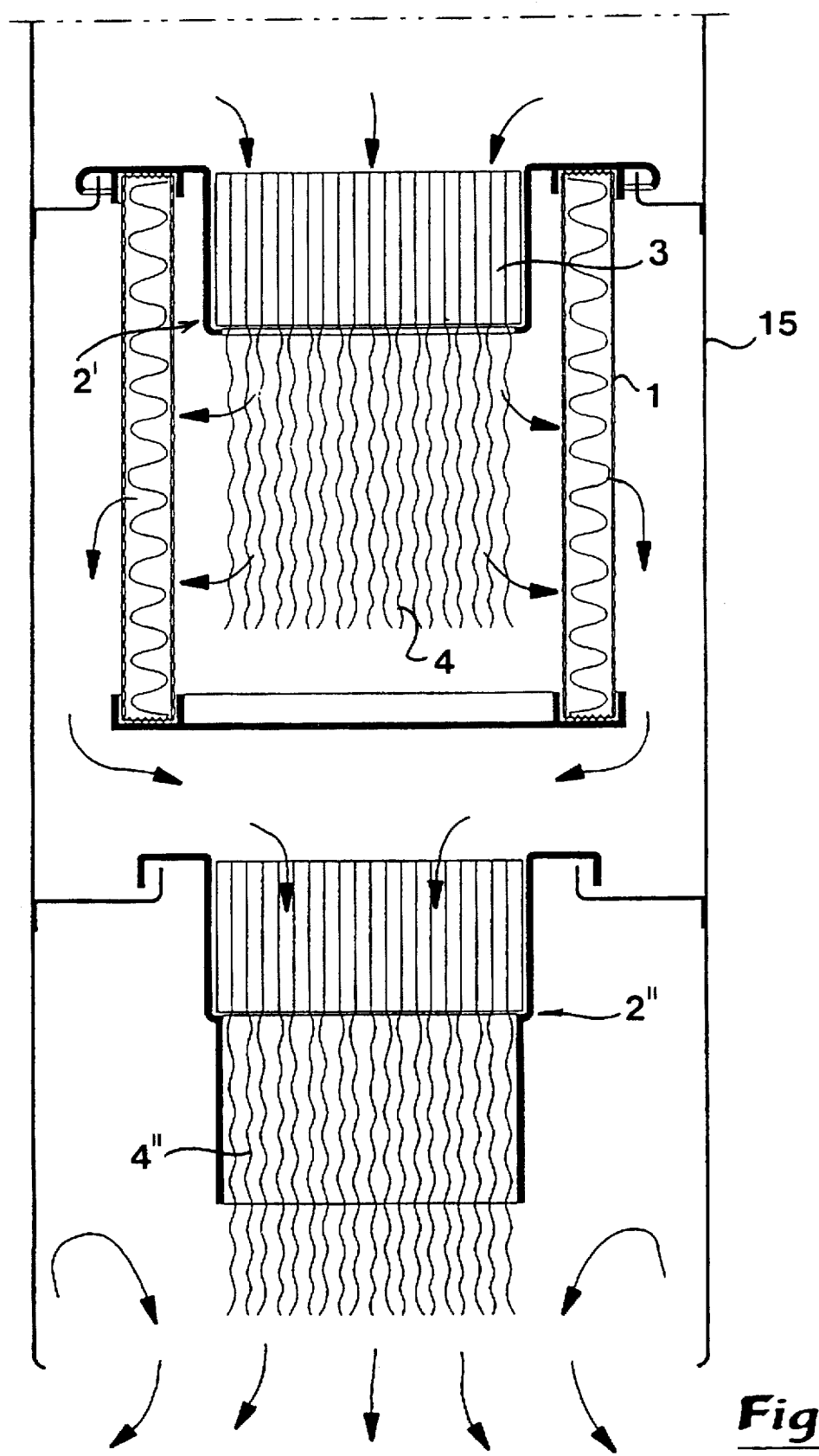

In FIG. 4, an embodiment is shown according to which a filter tube 1 is inserted into an external tube or housing 15, in which there is a second strip set 2" downstream of the filter tube, besides the first strip set 2' that is mounted in the filter tube 1 in the same way as in the previously described embodiments. After the air has undergone a first cleaning step in the filter tube 1, it is submitted to a final cleaning process in the strip set 2". In particular, it should be observed that the strips 4" in this strip set communicate with the environment without any surrounding filter. In this way, negative ions can be freely delivered from the strip set, these ions being formed in excess when the strips 4" are rubbed against each other. Such an ionization of the air that is eventually delivered from the arrangement, is to a large extent considered to contribute to an improvement of the air comfort in the surrounding room.

Figure 5:
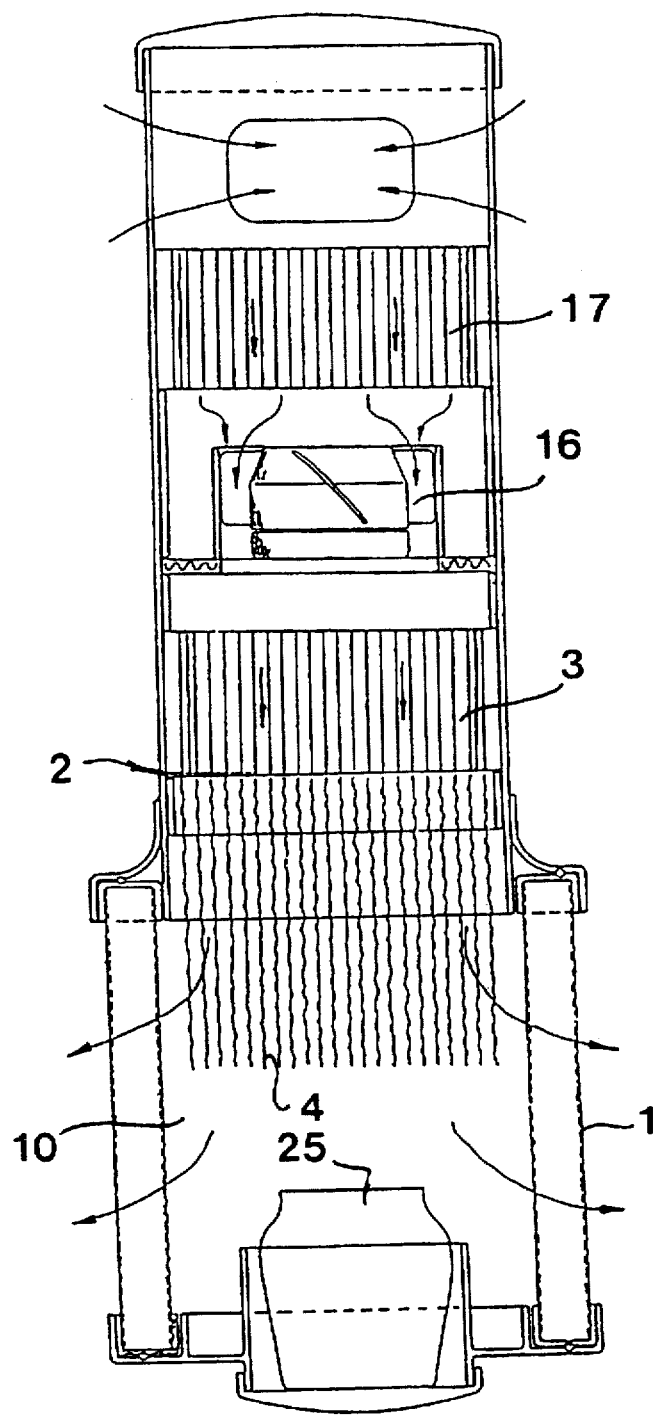

In FIG. 5 an embodiment is shown according to which the strips 4 of the strip set in question extend only partly into the cavity 10 that is delimited by a filter tube or tube wall 1. Upstream of the strip set there is a fan 16. Upstream of this fan, there is, in turn, mounted a silencer unit 17, whose configuration will be further described with reference to FIG. 6 to 11. Downstream of the strip set in the cavity 10 a container 25 is arranged for a scent-dispensing substance, suitably in the form of a gel.

Reference is now made to FIG. 6 to 10 which illustrate a most preferred embodiment from a production-technical point of view, of both the strip carrier 3 and the silencer unit 17.

Figure 6:
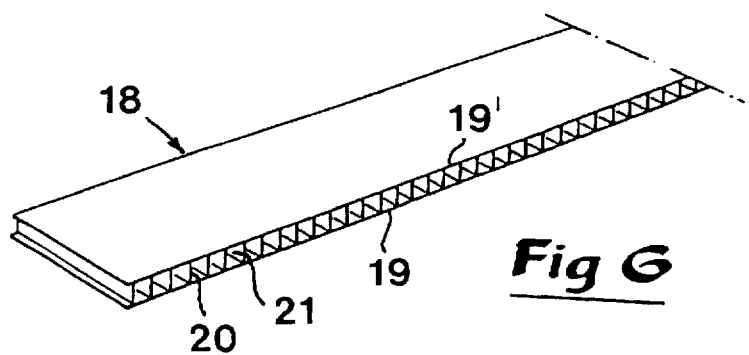
Figure 7:
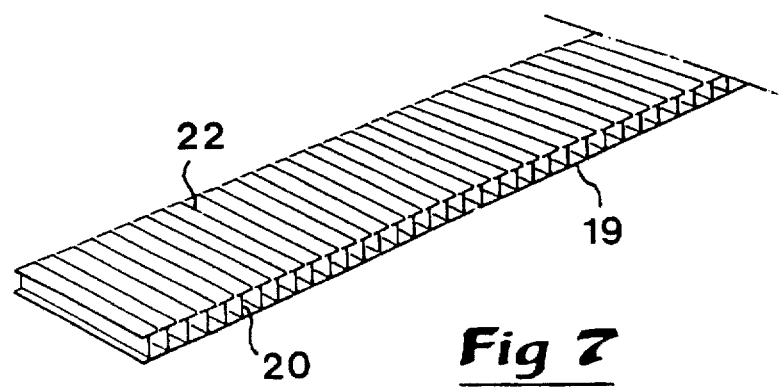

In FIG. 6 a starting workpiece 18 is shown which comprises two semi-stiff, although flexible bands 19, 19' which are held together and apart from each other by means of a plurality of interspaced interflanges 20. These interflanges are made in one piece with the two bands 19, 19' in order to delimit, by pairs and together with the bands, consecutive cavities or ducts 21 along the bands. In practice, the workpiece 18 that is made of one piece consists of comparatively thin plastic with a certain inherent stiffness. For both the bands 19, 19' and the interflanges 20, the thickness of the plastic may advantageously lie within the range of 0.2 to 0.8, suitably 0.4 to 0.6 mm. The internal distance between on one hand the bands 19, 19' and on the other hand adjacent interflanges 20, may advantageously lie within the range of 2 to 6, suitably about 3 to 4 mm. Thus, the ducts 21 advantageously have a square or rectangular cross-section with an area in the range of 4 to 36 $mm^2$. Advantageously, the width of bands 19, 19' may be within the range of 20 to 70, suitably 20 to 50 mm, while their length varies depending upon the factual diameter of the air flow duct in question through the filter tube or the particle separating housing. By making the ducts 21 with a comparatively large length in relation to the largest cross-sectional dimension (for instance 12–15:1), a nozzle effect is obtained which gives a pressure recovery in the air and a uniform high-frequency motion of following strips.

In practice, the workpiece 18 as shown in FIG. 6 is commercially available, albeit in units of a considerably larger length and width than shown in the figure.

According to a characteristic feature of the invention, slots 22 are provided in one of the two bands 19, 19', in this case band 19', between adjacent interflanges 20. Advantageously, though not necessarily, these slots are made between all pairs of adjacent interflanges, the individual slot suitably being located half-way between the flanges, extending parallel to these. In practice, the slots may be provided in different ways, e.g. by cutting with a suitable cutting tool. It is also feasible to make the slots already in connection with the production of the unit 18.

Figure 8:
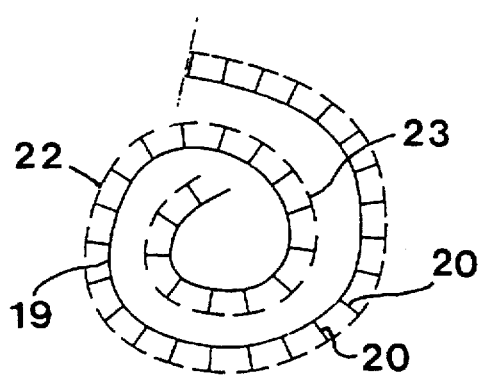
Figure 9:
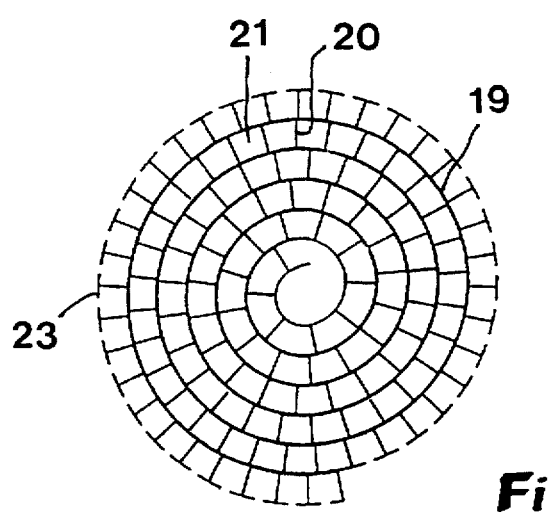

By the presence of the slots 22, the unit may be formed into a loop, preferably a spiral-shaped loop as shown in FIG. 8, in that the slots permit bending the unit around the slot-free band part 19, the latter serving as a joining element. When the band unit is formed into a spiral according to FIG. 8, the two bands 19, 19' will be located closely adjacently, whereby, however, the slotted band 19' will have obtained the shape of a plurality of lamella-like parts 23 which are internally separated in that the slots 22 widen in connection with the formation of the spiral loop. Thereby, the railhead-like lamella parts 23 form a support or abutment towards the inside of each externally located band part 19. This has the advantage that a plastic foil 24 (see FIG. 10) in which the previously mentioned strips 4 are provided, may be applied in the space between the lamellae and the externally located band part 19 without any risk of the plastic foil being sucked in into the internally located hole duct 21 which is delimited between two adjacent interflanges. For this reason, a strip-shaped plastic foil part 24, from which a plurality of strips 4 extend, may be fastened to the band 19 without any high demands for, e.g., a glue joint or another joining means, for instance tape. Most advantageously, such a plastic foil is fastened precisely by gluing or with tape, but it is even feasible to keep the foil between on one hand the inside of band 19 and on the other hand the outside of the lamellae 23 merely by a squeezing effect.

Figure 10:
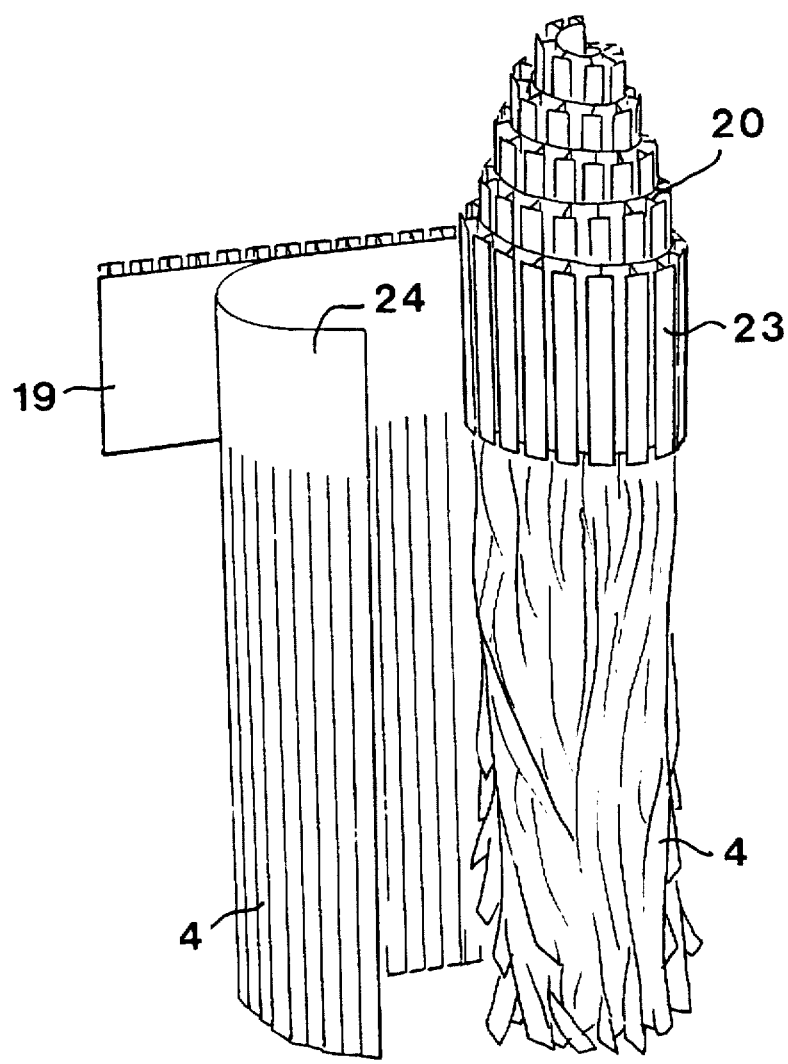

Thus, the unit formed into a spiral according to FIG. 8 may in an advantageous way be used as a carrier 3 for strips 4. This is illustrated in FIG. 10. However, it is also possible to use the spiral unit as a silencer of the kind indicated at 17 in FIG. 5. In this case, the unit lacks strips. According to a particularly preferred embodiment of the invention, the band loop may, when the unit is used for silencing purposes, be wound into a spiral form (see FIG. 10) at the same time as adjacent interflanges 20 are axially dislocated relative to each other to confer to the bands 19, 19', which are spiral-shaped when observed cross-sectionally, a helical shape when observed in the axial extension of the carrier. In this way, the capability of the unit or the insert to silence sounds in different frequency ranges is markedly increased. Such a helical shape can be conferred to the unit also in the case when it carries strips in the previously described way.

FEASIBLE MODIFICATIONS OF THE INVENTION

It is evident that the invention is not restricted solely to the embodiments described and shown in the drawings. Thus, albeit it in practice is preferred to use a unit of the type as illustrated in FIG. 6 to 10 as a carrier for the strips in question, the carrier may be formed in another way. It is for instance feasible to use a grate or a grate-like construction for holding the strips. Further, also other components than just strips may be used as movable, electricity-generating elements, for instance threads or thread-like elements. As electricity-generating elements, it is even feasible to use granule-shaped bodies of a suitable material, which are set in motion by the passing air. Such granule bodies can be held in place by the carrier together with, e.g., a grate cage or a perforated housing which is mounted within the filter tube in a suitable manner.

I claim:

1. An arrangement suitable for the separation of fine particles from a gas, comprising:

a filter tube, said tube at least partially composed of electrostatically chargeable fibres, said tube for passing a flow of gas radially in a direction from within said tube; and an insert positioned within said tube, said insert having a carrier supported transversely across an inner cavity of said tube and intersecting said tube, said carrier for holding within said tube a plurality of elements adapted for motion against each other when in contact with a flow of gas passing axially through said tube cavity, said motion producing an electrostatically charged field on said elements, whereby said charged field serves to maintain a charge on said chargeable fibres of said filter tube.

2. The arrangement as set forth in claim 1, wherein said elements comprise elongate flexible strips of polymeric material having a smooth surface and dense structure for accumulating particles.

3. The arrangement as set forth in claim 1, wherein said chargeable fibres in said filter tube comprise a polymeric material capable of accepting a bipolar electrical charge, said fibres each having a minimum length of 30 microns ($\mu$m) and a cross-sectional dimension of at least one micron.

4. The arrangement as set forth in claim 3, wherein said chargeable fibres comprise polypropylene fibres.

5. The arrangement as set forth in claim 3, wherein said elements comprise elongate flexible strips of polymeric material having a smooth surface and dense structure for accumulating particles.

6. The arrangement as set forth in claim 5, wherein said strips are held separated from said filter tube by a circumferential space for preventing contact between said strips and said filter tube.

7. The arrangement as set forth in claim 6, wherein said carrier comprises at least one flexible band to which said flexible strips are secured, said band configured to define a plurality of channels for directing and spreading the flow of gas.

8. The arrangement as set forth in claim 7, wherein said flexible band forms a spiral configuration.

9. The arrangement as set forth in claim 8, wherein said flexible band comprises a pair of stiff sheet members separated by a plurality of spaced interflanges defining a series of ducts through the carrier.

10. The arrangement as set forth in claim 9, wherein one of said stiff sheet members has a series of slots between said interflanges to facilitate bending said flexible band.

11. The arrangement as set forth in claim 10, wherein said flexible band is configured in an elongated helical configuration to assist in silencing sound of different frequency ranges.

* * * * *